(12) United States Patent
Yoo et al.

(10) Patent No.: US 11,372,404 B2
(45) Date of Patent: Jun. 28, 2022

(54) SYSTEMS AND METHODS FOR ADAPTIVE MODEL PROCESSING

(71) Applicant: QUALCOMM Incorporated, San Diego, CA (US)

(72) Inventors: Seungwoo Yoo, Yongin-si (KR); Jimin Jeon, Yong-in (KR); Hyun-Mook Cho, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 16/283,443

(22) Filed: Feb. 22, 2019

(65) Prior Publication Data

US 2020/0272149 A1    Aug. 27, 2020

(51) Int. Cl.
*G01C 22/00* (2006.01)
*G05D 1/00* (2006.01)
*G05B 13/02* (2006.01)
*G06N 3/04* (2006.01)
*G06N 3/08* (2006.01)

(52) U.S. Cl.
CPC ......... *G05D 1/0088* (2013.01); *G05B 13/027* (2013.01); *G06N 3/0454* (2013.01); *G06N 3/08* (2013.01); *G05D 2201/0213* (2013.01)

(58) Field of Classification Search
CPC ......... G05D 1/0088; G05D 2201/0213; G05B 13/027; G06N 3/0454; G06N 3/08; G06N 3/082; G06T 1/20
USPC ....................................................... 701/27
See application file for complete search history.

(56) References Cited

U.S. PATENT DOCUMENTS

| | | | |
|---|---|---|---|
| 2016/0328644 A1* | 11/2016 | Lin | G06N 3/084 |
| 2017/0277183 A1 | 9/2017 | Takahashi et al. | |
| 2018/0005520 A1* | 1/2018 | Blandin | H04L 67/12 |
| 2018/0308202 A1* | 10/2018 | Appu | G06F 9/46 |
| 2019/0080239 A1* | 3/2019 | Yang | G06N 3/0445 |
| 2020/0151549 A1* | 5/2020 | Hwang | G06F 7/5443 |
| 2020/0245141 A1* | 7/2020 | Antonatos | G06Q 50/30 |
| 2020/0267331 A1* | 8/2020 | Liu | G06N 3/02 |

OTHER PUBLICATIONS

IP.com Search—Dec. 29, 2020.*
IP.com Search—Dec. 30, 2020.*
TISA Guideline: "TPEG—What is it all about?", A guideline for understanding TPEG quickly, Jan. 2014, pp. 1-16.
Tomasi C., et al., "Detection and Tracking of Point Features", Technical Report CMU-CS-91-132, Apr. 1991, 22 pages.
Wikipedia: "Kanade-Lucas-Tomasi Feature Tracker", 2018, 6 pages.
International Search Report and Written Opinion—PCT/US2020/017299—ISA/EPO—dated Jun. 3, 2020.

* cited by examiner

*Primary Examiner* — Mahmoud S Ismail
(74) *Attorney, Agent, or Firm* — Polsinelli LLP (57) ABSTRACT

A method performed by an apparatus is described. The method includes receiving remote data. The method also includes adapting model processing based on the remote data. The method further includes determining a driving decision based on the adapted model processing. In some examples, adapting model processing may include selecting a model, adjusting model scheduling, and/or adjusting a frame computation frequency.

30 Claims, 9 Drawing Sheets

SYSTEMS AND METHODS FOR ADAPTIVE MODEL PROCESSING

FIELD OF DISCLOSURE

The present disclosure relates generally to electronic devices. More specifically, the present disclosure relates to systems and methods for adaptive model processing.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or more reliably are often sought after.

Some electronic devices process instructions and/or data. Some processing loads can be difficult to manage and may consume a large amount of resources such as processing bandwidth and power. As can be observed from this discussion, systems and methods that improve processing may be beneficial.

SUMMARY

A method performed by an apparatus is described. The method includes receiving remote data. The method also includes adapting model processing based on the remote data. The method further includes determining a driving decision based on the adapted model processing.

Adapting model processing may include selecting a neural network based on the remote data. Selecting the neural network may include selecting between a first neural network and a second neural network. The first neural network may include more nodes than the second neural network. The first neural network may utilize more multiply-accumulate operations (MACs) or floating point operations per second (FLOPs) than the second neural network.

Adapting model processing may include adjusting neural network scheduling. Adjusting the neural network scheduling may include adjusting a computation rate for a neural network. Adjusting the neural network scheduling may include transferring neural network computation from a first processor to a second processor.

Adjusting model processing may include adjusting a frame computation frequency for a neural network. The neural network may be computed for a first subset of a set of frames and computer vision tracking may be performed for at least a second subset of frames. The second subset of frames may be complementary to the first subset of frames.

An apparatus is also described. The apparatus includes a memory. The apparatus also includes at least one processor in electronic communication with the memory. The at least one processor is configured to receive remote data. The at least one processor is also configured to adapt model processing based on the remote data. The at least one processor is further configured to determine a driving decision based on the adapted model processing.

A non-transitory tangible computer-readable medium storing computer executable code is also described. The computer-readable medium includes code for causing an apparatus to receive remote data. The computer-readable medium also includes code for causing the apparatus to adapt model processing based on the remote data. The computer-readable medium further includes code for causing the apparatus to determine a driving decision based on the adapted model processing.

An apparatus is also described. The apparatus includes means for receiving remote data. The apparatus also includes means for adapting model processing based on the remote data. The apparatus further includes means for determining a driving decision based on the adapted model processing.

DETAILED DESCRIPTION

The systems and methods disclosed herein relate to adaptive model processing. As used herein, the term "model" refers to a machine learning model and/or a deep learning model. Examples of a model include an artificial neural network and/or a deep neural network (DNN). Models may be processed to perform a variety of tasks. For example, models may be applied in driving control. For instance, a model may be processed to detect one or more objects in an image, to perform scene analysis, and/or to process sensor data (e.g., radar processing, lidar processing, etc.). Processing the model may be performed to achieve driving control, such as autonomous driving, semi-autonomous driving, driving assistance, etc.

Complex model processing and/or high-rate model processing may utilize a relatively large amount of resources such as processing bandwidth and/or power. Accordingly, performing model processing indiscriminately may be wasteful or inefficient in some cases. In the context of driving tasks, for instance, performing model processing on every frame of sensor data may unnecessarily utilize resources. For example, complex and/or high rate model processing may not be necessary in cases of traffic congestion or an open road, but may be beneficial in cases such as traffic accidents or road construction. For instance, it may be beneficial to utilize a more complex model for increased reliability and/or to utilize a higher model processing rate (e.g., frames per second (FPS)) in accident cases or road construction cases. Accordingly, adapting model processing to a case at hand may be beneficial. For example, adaptive model processing based on road and/or traffic conditions may improve processing efficiency and/or reduce resource consumption. For instance, some configurations of the systems and methods disclosed herein may relate to scheduling a model (e.g., DNN) processing pipeline for autonomous driving based on traffic conditions. As can be observed from this discussion, some of the systems and methods disclosed herein may improve the functioning of a computer itself, by improving the processing efficiency and/or reducing resource consumption. Some of the systems and methods disclosed herein may also improve another technology or technical field. For example, some configurations of the systems and methods disclosed herein may improve the fields of autonomous driving, semi-autonomous driving, and/or assisted driving by adapting model processing based on driving conditions, which may provide model accuracy and/or speed tailored to the driving conditions.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
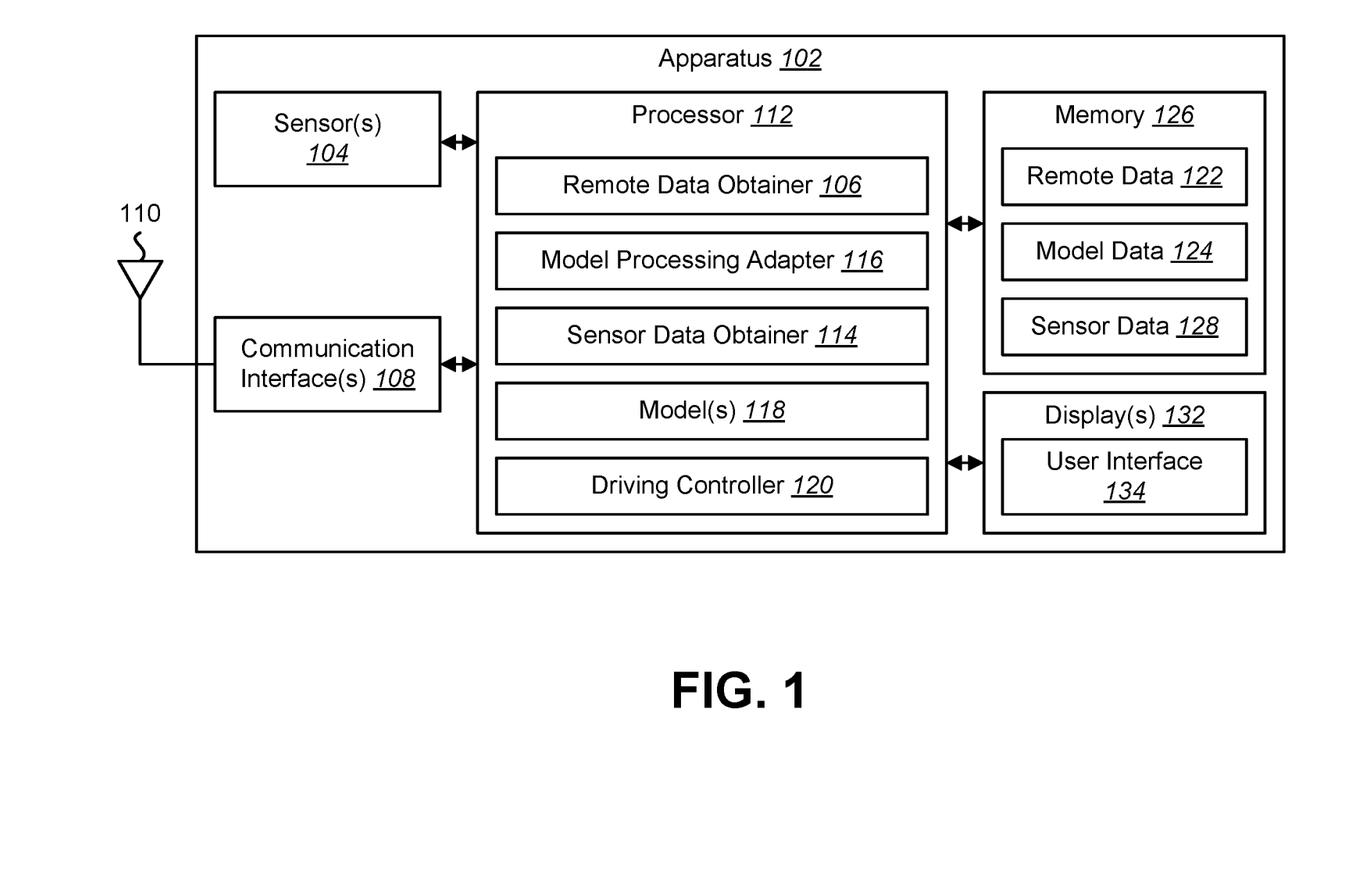
FIG. 1 is a block diagram illustrating one example of an apparatus in which systems and methods for adaptive model processing may be implemented.

FIG. 1 is a block diagram illustrating one example of an apparatus 102 in which systems and methods for adaptive model processing may be implemented. Examples of the apparatus 102 include electronic devices, vehicles, autonomous vehicles, cameras, video camcorders, digital cameras, smart phones, computers (e.g., integrated computers, on-board computers, laptop computers, etc.), tablet devices, personal cameras, action cameras, surveillance cameras, mounted cameras, connected cameras, robots, aircraft, drones, unmanned aerial vehicles (UAVs), healthcare equipment, gaming consoles, personal digital assistants (PDAs), etc. For instance, the apparatus 102 may be an autonomous vehicle, a self-driving vehicle, etc., and/or may include an Advanced Driver Assistance System (ADAS). The apparatus 102 may include one or more components or elements. One or more of the components or elements may be implemented in hardware (e.g., circuitry, an application specific integrated circuit (ASIC), etc.), implemented in a combination of hardware and software (e.g., a processor with instructions), and/or may be implemented in firmware.

In some configurations, the apparatus 102 may include one or more processors 112, a memory 126 (e.g., one or more memory devices), one or more displays 132, one or more sensors 104, and/or one or more communication interfaces 108. The processor 112 may be coupled to (e.g., in electronic communication with) the memory 126, display(s) 132, sensor(s) 104, and/or communication interface(s) 108. It should be noted that one or more of the elements illustrated in FIG. 1 may be optional. In particular, the apparatus 102 may not include one or more of the elements illustrated in FIG. 1 in some configurations. For example, the apparatus 102 may or may not include a sensor 104. Additionally or alternatively, the apparatus 102 may or may not include a display 132. Additionally or alternatively, the apparatus 102 may or may not include a communication interface 108.

In some configurations, the apparatus 102 may perform one or more of the functions, procedures, methods, steps, etc., described in connection with one or more of FIGS. 1-9. Additionally or alternatively, the apparatus may include one or more of the structures described in connection with one or more of FIGS. 1-9.

The processor 112 is one or more devices configured to process instructions and/or data. The processor 112 may be implemented in electronic circuitry (e.g., integrated circuitry, transistors, registers, etc.). For example, the processor 112 may be a processor implemented in integrated circuitry, an ASIC, a field-programmable gate array (FPGA), etc. Instructions and/or data may be provided to the processor 112 from memory 126.

The memory 126 is one or more devices configured to store instructions and/or data. The memory 126 may include volatile and/or non-volatile memory. Examples of the memory 126 include random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), flash memory, dynamic random-access memory (DRAM), synchronous DRAM (SDRAM), etc.

The memory 126 may store instructions and/or data. The processor 112 may access (e.g., read from and/or write to) the memory 126. Examples of instructions and/or data that may be stored by the memory 126 may include remote data 122, model data 124, sensor data 128, object detection data, object location data, object tracking data, remote data obtainer 106 instructions, model processing adapter 116 instructions, sensor data obtainer 114 instructions, model 118 instructions, driving controller 120 instructions, and/or instructions for one or more other elements, etc.

The communication interface 108 is a device or component (e.g., hardware and/or software) configured to send and/or receive signals. The communication interface 108 may enable the apparatus 102 to communicate with one or more other apparatuses. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), 5G, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface). In some configurations, the communication interface 108 may send information (e.g., remote data requests, sensor data 128, driving control information, etc.) to and/or may receive information (e.g., remote data 122, model data 124, sensor data 128, etc.) from another apparatus (e.g., a vehicle, a smart phone, a camera, a display, a remote server, etc.).

The one or more sensors 104 is a device or devices configured to sense information from an environment. Examples of the sensor(s) 104 include one or more image sensors (e.g., visual spectrum image sensors, cameras), infrared sensors, thermal sensors, audio sensors (e.g., microphones), depth sensors (e.g., time-of-flight cameras), light detection and ranging (lidar) sensors, radio detection and ranging (radar) sensors, etc. Examples of information sensed from the environment may include still images, video (e.g., a sequence of image frames), depth maps, thermal maps, audio, etc.

In some configurations, the apparatus 102 may include one or more optical systems (not shown in FIG. 1). An optical system may focus images of objects that are located within the field of view of the optical system onto a sensor 104. For example, the optical system may include one or more lenses. The optical system(s) may be coupled to and/or controlled by the processor 112 in some configurations.

A camera may include at least one image sensor and at least one optical system. Accordingly, the apparatus 102 may be one or more cameras and/or may include one or more cameras in some implementations. In some configurations, the sensor(s) 104 may capture one or more images (e.g., image frames, video, still images, burst mode images, stereoscopic images, etc.). For example, a camera with a particular resolution (e.g., video graphics array (VGA) resolution, 1280×800 pixels, etc.), at a particular frame rate (e.g., 30 frames per second (fps), 60 fps, 120 fps, etc.) may be utilized. In other implementations, the apparatus 102 may include multiple optical system(s) and/or multiple sensors 104. For example, the apparatus 102 may include two or more lenses in some configurations. The lenses may have the same focal length or different focal lengths.

In some configurations, the apparatus 102 may request and/or receive one or more images from another apparatus (e.g., one or more external image sensors coupled to the apparatus 102, a network server, drop camera, vehicle camera(s), etc.). In some configurations, the apparatus 102 may request and/or receive the one or more images via the communication interface 108. For example, the apparatus 102 may or may not include a camera (e.g., a sensor 104 and/or an optical system) and may receive images from one or more remote devices.

In some examples, the sensor(s) 104 and/or the optical system(s) may be mechanically coupled to the apparatus 102 (e.g., may be attached to, mounted on, and/or integrated into the hood of a car, a rear-view mirror mount, a side-view mirror, a bumper, anywhere else within the interior or on the exterior of the apparatus 102, etc.). The sensor(s) 104 may be linked to the apparatus 102 via wired and/or wireless link. For example, the sensor(s) 104 may be hardwired to a control mechanism (e.g., processor 112) in a vehicle, or information captured by the image sensor(s) may be wirelessly transmitted (e.g., streamed or otherwise wirelessly transported) to the control mechanism (e.g., processor 112).

The one or more displays 132 is/are a device or devices configured to present an image. Examples of displays 132 include liquid crystal displays (LCDs), organic light emitting diode (OLED) displays, light emitting diode (LED) panels, projectors, etc. In some configurations, the apparatus 102 may present a user interface 134 on the display 132. For example, the user interface 134 may enable a user to interact with the apparatus 102. In some configurations, the display 132 may be a touchscreen that receives input from physical touch (by a finger, stylus, or other tool, for example). Additionally or alternatively, the apparatus 102 may include or be coupled to another input interface. For example, the apparatus 102 may include a camera facing a user and may detect user gestures (e.g., hand gestures, arm gestures, eye tracking, eyelid blink, etc.). In another example, the apparatus 102 may be coupled to a mouse and may detect a mouse click.

In some configurations, one or more of the images described herein may be presented on the display 132 and/or user interface 134. For example, images of scenes and/or objects that are located within the field of view of image sensor(s) may be presented on the display 132. In some configurations, video captured by image sensor(s) may be presented on the display 132. For example, the display(s) 132 may be configured to output a view of one or more objects (e.g., vehicles, roads, signs, lane markers, construction barriers, etc.).

The display(s) 132 may be integrated into the apparatus 102 and/or may be coupled to the apparatus 102. For example, the apparatus 102 may be a laptop computer, tablet device, or smart phone with integrated displays. In another example, the apparatus 102 may be a virtual reality headset with integrated displays 132. In another example, the apparatus 102 may be a computer that is coupled to a virtual reality headset with the displays 132. In another example, the apparatus 102 may be a vehicle.

The processor 112 may include and/or implement a remote data obtainer 106, a model processing adapter 116, a sensor data obtainer 114, one or more models 118, and/or a driving controller 120. It should be noted that one or more of the elements illustrated in the apparatus 102 and/or processor 112 may be optional. For example, the processor 112 may not include and/or may not implement the remote data obtainer 106, the model processing adapter 116, the sensor data obtainer 114, the model(s) 118, and/or the driving controller 120 in some configurations. Additionally or alternatively, one or more of the elements illustrated in the processor 112 may be implemented separately from the processor 112 (e.g., in other circuitry, on another processor, on a separate electronic device, on a graphics processing unit (GPU), etc.).

The processor 112 may include and/or implement a sensor data obtainer 114. The sensor data obtainer 114 may obtain sensor data 128. Sensor data 128 is data provided by one or more sensors (e.g., sensor(s) 104 on the apparatus 102, sensor(s) coupled to the apparatus 102, and/or remote sensor(s)). The sensor data 128 may be stored in the memory 126. Examples of sensor data 128 include image data, video data, depth map data, lidar data, radar data, thermal data (e.g., temperature), etc.

The processor 112 may include and/or implement one or more models 118. For example, the processor 112 may utilize model data 124 stored in the memory 126 to implement the model(s) 118. For example, model data 124 may indicate model structure and/or training (e.g., weights). Model 118 instructions may be executed using the model data 124 to produce model output(s). As described above, examples of the model(s) 118 include machine learning models, deep learning models, artificial neural networks, deep neural networks, etc. The model(s) 118 may be implemented to perform one or more tasks. The model(s) 118 may utilize the sensor data 128 to perform the one or more tasks. Examples of tasks that may be performed by the model(s) 118 include object detection, object tracking, sign reading, vehicle detection, pedestrian detection, lane marker detection, driving decisions, etc. For instance, the model(s) 118 may perform object detection and/or object tracking based on images and/or video provided by the sensor(s) 104.

One or more tasks may be performed to control driving. For example, if a pedestrian is walking in a roadway, the model(s) 118 may detect the pedestrian and make a driving decision to slow down, stop, and/or avoid the pedestrian. In another example, the model(s) 118 may read a stop sign and make a driving decision to stop. In another example, the model(s) 118 may detect a vehicle collision and make a driving decision to evade the vehicle collision.

The processor 112 may include and/or implement a driving controller 120. The driving controller 120 is configured to control driving. For example, the driving controller 120 may control one or more aspects of driving, such as acceleration, steering, braking, turning, shifting, etc. In some configurations, the apparatus 102 may be a vehicle, and the driving controller 120 may control driving of the apparatus 102. In some configurations, the apparatus 102 is a separate device in communication with a vehicle and may control driving of the vehicle via the communication (e.g., remotely).

The processor 112 may implement and/or include the remote data obtainer 106. The remote data obtainer 106 may be configured to receive remote data 122. Remote data 122 is data provided by a remote apparatus. Examples of remote apparatuses include servers, vehicles, cameras, drones, computers, tablet devices, etc. In some configurations, the communication interface(s) 108 may request and/or receive the remote data 122 from one or more remote apparatuses. The remote data obtainer 106 may receive the remote data 122 from the one or more remote apparatuses and/or from the communication interface(s) 108. The remote data 122 may be stored in the memory 126.

Examples of the remote data 122 include traffic condition information, road condition information, construction information, congestion information, driving information, safety information, road event information, map information, point of interest information (e.g., information indicating locations such as restaurants, shopping centers, parks, gas stations, rest stops, offices, etc.), accident information, etc. In some configurations, the remote data 122 may be received in accordance with a traffic information delivery protocol. For example, the remote data 122 may be received in accordance with a Transport Protocol Experts Group (TPEG) protocol, which may provide traffic condition broadcasting. Sources (e.g., remote apparatuses) for the remote data may include, for example, map servers, traffic information servers, wireless base stations, web servers, news provider servers, vehicles, drones, smart phones, tablet devices, etc.

The processor 112 may implement and/or include a model processing adapter 116. The model processing adapter 116 may be configured to adapt model 118 processing based on the remote data 122. Adapting model 118 processing may include selecting a model, adjusting model scheduling, and/or adjusting a frame computation frequency (and/or inference). For example, model selection may include selecting or utilizing a heavier or lighter model depending on traffic conditions. Model scheduling may include running a processor 112 at variable clock speeds (e.g., full clock speed for fast frames per second (fps) performance, for instance) and/or executing the model 118 on a different processor. In some examples, adjusting a frame computation frequency for a model 118 may include selecting a proportion of frames (e.g., video frames) for which the model 118 is executed. For instance, it may be wasteful to run a DNN on all frames in some conditions. It may be beneficial to selectively run a DNN on some frames of road scenes for autonomous driving based on traffic conditions.

Adapting model 118 processing may be based on one or more conditions indicated by the remote data 122. For example, the remote data 122 may indicate a traffic condition on a road where a vehicle (e.g., apparatus 102) is traveling. Examples of traffic conditions may include congested traffic, moderate traffic, open road, traffic accident, and construction. Congested traffic is a condition where traffic is moving relatively slowly (e.g., less than 10 miles per hour) and/or the road is densely occupied with many vehicles (e.g., with less than a threshold amount of spacing or average spacing between vehicles). Moderate traffic is a condition where traffic is moving approximately at an expected speed and/or the road is moderately occupied (e.g., within a range of spacing or average spacing between vehicles). Open road is a condition where there are few other vehicles, if any, on the road. A traffic accident is a condition where an aberration in traffic has occurred (due to a collision, crash, accident, obstruction, malfunction, emergency, etc., for example). Construction is a condition where road construction, construction planning, construction management, or other construction impacts traffic. For example, construction barriers, traffic cones, lane restrictions due to construction, obstructions due to construction, road changes, etc., may impact traffic. Other traffic conditions may also be indicated by the remote data, such as slick roads, precipitation (e.g., rain, snow, sleet, etc.), damaged roads, dangerous conditions, flooding, etc.

In some configurations, adapting model 118 processing may include selecting a model 118 from a set of models 118 based on the remote data. Different models 118 (e.g., neural networks) may utilize different amounts of processing. The different amounts of processing utilized by different models 118 may be reflected by a number of nodes in a given model or a number of operations performed by a given model. For example, a "heavier" model may utilize more processing to execute than a "lighter" model, where a heavier model includes more nodes and/or utilizes more operations (e.g., multiply-accumulate operations (MACs) and/or floating point operations per second (FLOPs)) than a lighter model. In some configurations, lighter models may be categorized within a first range of number of nodes and/or operations and heavier models may be categorized in a second range of number of nodes and/or operations that is greater than the first range. Heavier models may provide greater accuracy and/or may be configured to manage a wider variety of situations than lighter models in some configurations. For example, a lighter model (e.g., lighter neural network) may provide lower precision and/or may require less resources for execution than a heavier model. This may allow a lighter model to be run at a higher rate (e.g., at an increased rate of detection and/or tracking) while lowering resource (e.g., processing and power) utilization at the expense of precision.

In some approaches, the model processing adapter 116 may select a model based on the traffic conditions indicated by the remote data 122. For example, the model processing adapter 116 may select a heavier model for certain traffic conditions or a lighter model for other traffic conditions. For instance, when the traffic condition is congested traffic or open road, the model processing adapter 116 may select a lighter model. When the traffic condition is moderate traffic, accident, or construction, the model processing adapter 116 may select a heavier model.

In an example, selecting the model 118 includes selecting between a first model and a second model from the set of models 118. In this example, the first model (e.g., first neural network) includes more nodes than the second model (e.g., second neural network). Additionally or alternatively, the first model utilizes more operations (e.g., MACs and/or FLOPs) than the second model. If the remote data 122 indicates congested traffic or open road, the model processing adapter 116 may select the second model. If the remote data 122 indicates moderate traffic, accident, or construction, the model processing adapter 116 may select the first model.

In some configurations, adapting model 118 processing may include adjusting model 118 (e.g., neural network) scheduling based on the remote data. Adjusting model 118 scheduling may include adjusting a computation rate (e.g., clock speed) for the model and/or transferring model computation between processors. Adjusting the computation rate for the model may include adjusting the clock speed at which a processor is running, where the processor is executing the model 118. For example, if the remote data 122 indicates congested traffic or open road, the model processing adapter 116 may lower the clock speed. If the remote data 122 indicates moderate traffic, accident, or construction, the model processing adapter 116 may increase the clock speed. In some examples, if the remote data 122 indicates a particular kind of driving area (e.g., an area where increased precision and fast response are beneficial, such as in a school zone, construction area, animal crossing region, etc.), then the clock speed (e.g., clock rate) may be increased to prevent potential accidents.

In some configurations, an amount of adjustment (e.g., increase or decrease) in the clock speed may be a set amount (e.g., a predetermined amount) or a variable amount. For instance, the amount of adjusting the clock speed may be selected from a set of predetermined amounts based on one or more conditions. In some approaches, the clock speed may be selected from one or more tables (e.g., look up tables) based on the one or more conditions (e.g., area, amount of traffic, potential for pedestrians, potential for bikes, weather, etc.). Additionally or alternatively, the amount of adjusting the clock speed may be selected in an online fashion (e.g., at runtime) based on computational budget of the apparatus 102. For example, an amount of increase of the clock speed may be a maximum amount allowed by the computational budget. In another example, the amount of increase may be a proportion (e.g., 25%, 50%, 75%, etc.) of available computational budget.

In some configurations, adjusting model 118 scheduling may additionally or alternatively include transferring neural network computation between processors (e.g., from a first processor to a second processor). For instance, the apparatus 102 may include multiple processors 112 in some configurations. In some configurations, the remote data obtainer 106, the model processing adapter 116, the sensor data obtainer 114, the model(s) 118, and/or the driving controller 120 may be distributed among multiple processors 112 and/or shared by multiple processors 112. Examples of the processors 112 may include graphics processing units (GPUs), digital signal processors (DSPs), and central processing units (CPUs). In some approaches, if the remote data 122 indicates congested traffic or open road, the model processing adapter 116 may transfer computation to (or maintain computation at) a DSP and/or CPU. Computation of the model 118 on the DSP and/or CPU may increase power efficiency or reduce power consumption. If the remote data 122 indicates moderate traffic, accident, or construction, the model processing adapter 116 may transfer computation to (or maintain computation at) a GPU. In some approaches, both a computation rate may be increased and computation may be transferred to a GPU for moderate traffic, accident, or construction conditions. Additionally or alternatively, both a computation rate may be decreased and computation may be transferred to a DSP and/or CPU for congested or open road conditions.

In some configurations, adapting model 118 processing may include adjusting a frame computation frequency (and/or inference). For example, the model processing adapter 116 may determine how often or a proportion of frames for which a model 118 is executed (or models 118 are executed). In some approaches, if the remote data 122 indicates congested traffic or open road, the model processing adapter 116 may reduce a proportion of frames for which (and/or how often) the model 118 is executed. Reducing the frame computation frequency may decrease a rate of model-based object detection and/or scene analysis, which may take a relatively large computational budget. If the remote data 122 indicates moderate traffic, accident, or construction, the model processing adapter 116 may increase a proportion of frames for which (and/or how often) the model 118 is executed. For instance, the model 118 may be executed for a larger proportion of frames or for all frames.

Additionally or alternatively, inference may be performed in some approaches by applying computer vision (CV) tracking (e.g., non-neural network CV tracking) instead of executing the model 118 (e.g., CPU based computer vision tracking rather than neural network-based tracking) for one or more frames. Examples of CV tracking may include and/or may be based on optical flow-based feature tracking, Kanade-Lucas-Tomasi (KLT) feature tracking, and/or filtering-based tracking (e.g., Kalman filter-based tracking, particle filter-based tracking), etc. In some examples, the model 118 may be executed periodically, and CV tracking (without model 118 execution, for example) may be performed between the periodic execution of the model 118.

In some approaches, for example, inference may be performed for one or more frames between frames where the model 118 is executed. In an example, the model 118 (e.g., neural network) may be computed for a first subset of a set of frames and CV tracking may be performed for at least a second subset of frames, where the second subset of frames is complementary to the first subset of frames. In this context, a second subset that is "complementary" to a first subset may mean that the second subset includes one or more elements that are not in the first subset. For example, assume a set of 100 frames that are numbered from 0 to 99. A first subset of frames may include 20 frames with frame numbers 0, 5, 10, 15, 20, 25, 30, 35, 40, 45, 50, 55, 60, 65, 70, 75, 80, 85, 90, and 95. A second subset of frames that is complementary to the first subset of frames may include the remaining 80 frames with frame numbers 1-4, 6-9, 11-14, 16-19, 21-24, 26-29, 31-34, 36-39, 41-44, 46-49, 51-54, 56-59, 61-64, 66-69, 71-74, 76-79, 81-84, 86-89, 91-94, and 96-99. In some examples, the model 118 may be executed for the first subset of 20 frames and the CV tracking may be performed for the second subset of 80 frames.

In some configurations, the model processing adapter 116 may additionally or alternatively change one or more thresholds based on the remote data 122. In some examples, one or more thresholds may be changed that determine whether to utilize higher precision and/or a heavier model 118 based on the remote data 122. For example, if the remote data 122 (e.g., traffic data, news data) indicates a traffic accident and/or road construction, then one or more thresholds may be changed, which may influence a decision for high precision or using a heavier model with high precision.

In some examples, a model 118 (e.g., neural network) output may represent one or more probabilities for performing a task. The one or more probabilities may be used for decision making (e.g., path planning, motion control, speed, steering, etc.). In some configurations, the raw output of the one or more probabilities may be utilized with one or more thresholds to determine whether to make one or more decisions (or not). In some cases where model 118 performance may be degraded (e.g., some road event cases such as car accidents and/or environmental conditions such as rain, snow, etc.), the model processing adapter 116 may control thresholds for decisions. In some configurations, an amount of adjustment (e.g., increase or decrease) in the threshold or thresholds may be a set amount (e.g., a predetermined amount) or a variable amount. For instance, the amount of adjusting the threshold(s) may be selected from a set of predetermined amounts based on one or more conditions. In some approaches, the threshold(s) may be selected from one or more tables (e.g., look up tables) based on the one or more conditions (e.g., area, amount of traffic, potential for pedestrians, potential for bikes, weather, etc.). Additionally or alternatively, the amount of adjusting the threshold(s) may be selected in an online fashion (e.g., at runtime).

In some configurations, the processor 112 (e.g., model(s) 118) may determine a driving decision based on the adapted model processing. For example, the model(s) 118 may determine a driving decision (e.g., whether to accelerate, decelerate, brake, steer, change lanes, avoid an obstruction, etc.) based on the adapted model processing. For instance, the adapted model processing may determine model selection, adjusted model scheduling, and/or adjusted a frame computation frequency (and/or inference), which may impact the driving decision produced by the model(s) 118.

The apparatus 102 (e.g., processor 112) may optionally be coupled to, be part of (e.g., be integrated into), include, and/or implement one or more kinds of devices. For example, the apparatus may be implemented in a vehicle equipped with one or more cameras.

Figure 2:
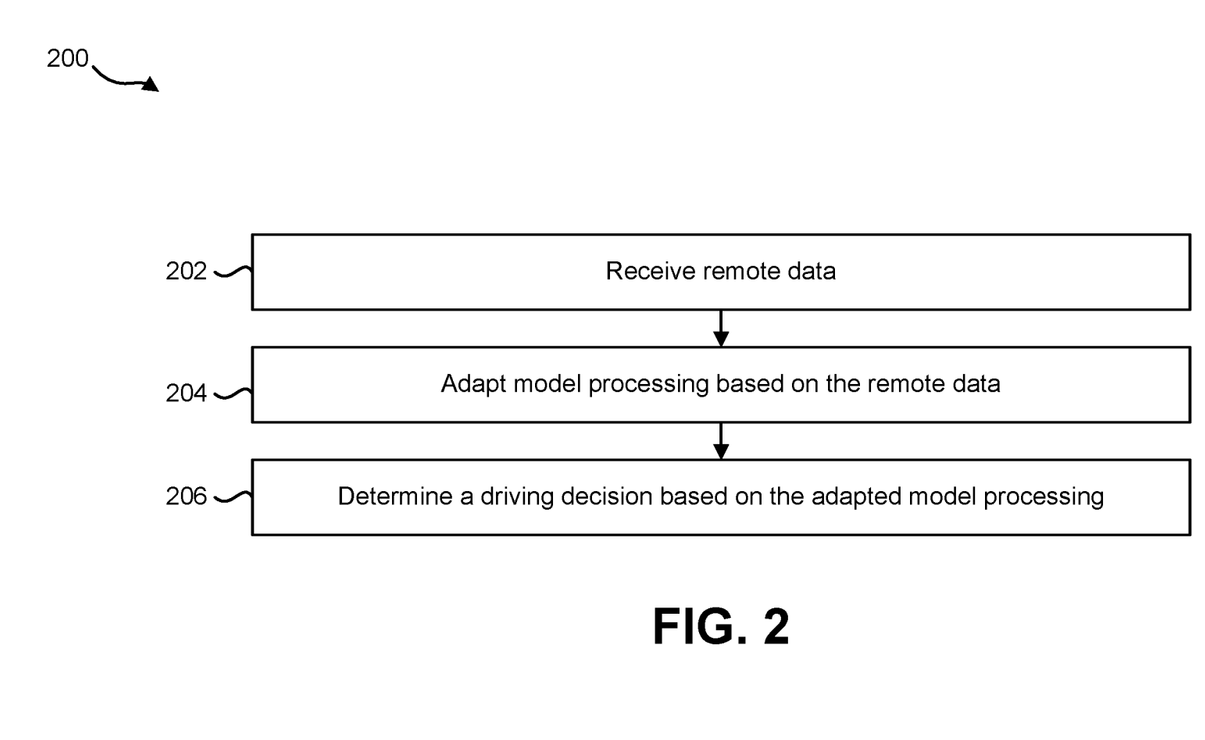
FIG. 2 is a flow diagram illustrating one configuration of a method for adaptive model processing.

FIG. 2 is a flow diagram illustrating one configuration of a method 200 for adaptive model processing. The method 200 may be performed by the apparatus 102, for example.

The apparatus 102 may receive 202 remote data. This may be accomplished as described in connection with FIG. 1. For example, the apparatus 102 may receive remote data, such as traffic condition information, news, weather information, construction alerts, travel times, etc., from one or more remote apparatuses.

The apparatus 102 may adapt 204 model processing based on the remote data. This may be accomplished as described in connection with FIG. 1. For example, the apparatus 102 may select a model, adjust model scheduling, and/or adjust a frame computation frequency (and/or inference). In some configurations, the apparatus 102 may change one or more thresholds based on the remote data as described in connection with FIG. 1.

The apparatus 102 may determine 206 a driving decision based on the adapted model processing. This may be accomplished as described in connection with FIG. 1. For example, the apparatus 102 may execute a model or models based on the model selection, adjusted model scheduling, and/or adjusted frame computation frequency (and/or inference). In some configurations, the apparatus 102 may control a vehicle based on the driving decision. For example, the apparatus 102 may execute the driving decision to control vehicle movement or may send the driving decision to a vehicle to control the vehicle.

Figure 3:
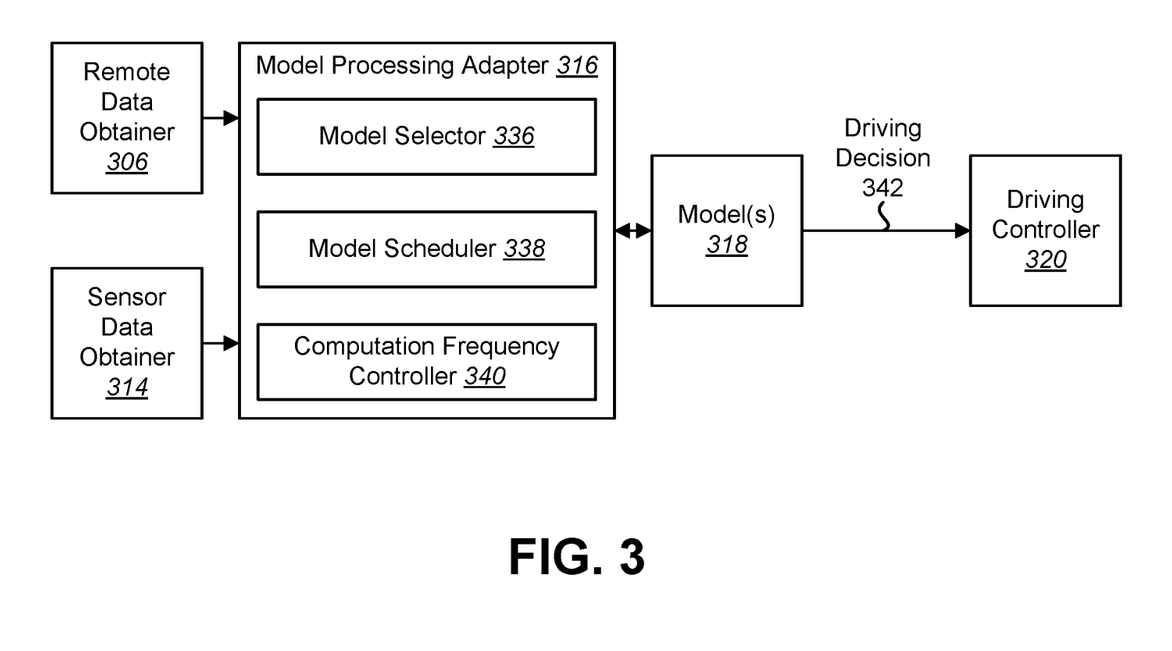
FIG. 3 is a block diagram illustrating an example of one or more elements and/or functions that may be implemented in accordance with some configurations of the systems and methods disclosed herein.

FIG. 3 is a block diagram illustrating an example of one or more elements and/or functions that may be implemented in accordance with some configurations of the systems and methods disclosed herein. For example, one or more of the elements and/or functions described in connection with FIG. 3 may be included in and/or performed by the apparatus 102 described in connection with FIG. 1. In particular, FIG. 3 illustrates a remote data obtainer 306, a sensor data obtainer 314, a model processing adapter 316, model(s) 318, and a driving controller 320. These elements may be examples of corresponding elements described in connection with FIG. 1.

In FIG. 3, the model processing adapter 316 includes a model selector 336, a model scheduler 338, and a computation frequency controller 340. The model selector 336 may select between models 318 as described in connection with FIG. 1. For example, the model selector 336 may select a heavier model if remote data from the remote data obtainer 306 indicates moderate traffic, accident, or construction conditions. Or, the model selector 336 may select a lighter model if the remote data indicates congested traffic or open road conditions.

The model processing adapter 316 may include a model scheduler 338. The model scheduler 338 may adjust model scheduling as described in connection with FIG. 1. For example, the model scheduler 338 may increase a clock speed of a processor and/or transfer model 318 computation to a different processor if remote data from the remote data obtainer 306 indicates moderate traffic, accident, or construction conditions. Or, the model scheduler 338 may decrease a clock speed of a processor and/or transfer model 318 computation to a different processor if remote data from the remote data obtainer 306 indicates congested traffic or open road conditions.

The model processing adapter 316 may include a computation frequency controller 340. The computation frequency controller 340 may adjust model 318 computation frequency as described in connection with FIG. 1. For example, the computation frequency controller 340 may increase a proportion of frames for which the model 318 is executed if remote data from the remote data obtainer 306 indicates moderate traffic, accident, or construction conditions. Or, the computation frequency controller 340 may decrease a proportion of frames for which the model 318 is executed if remote data from the remote data obtainer 306 indicates congested traffic or open road conditions.

It should be noted that the model processing adapter 316 may include one, some, or all of the model selector 336, the model scheduler 338, or the computation frequency controller 340. In some configurations, the model selector 336, model scheduler 338, and/or computation frequency controller 340 may be operated in parallel and/or concurrently. For example, model selection, model scheduling adjustment, and/or computation frequency adjustment may be performed together (e.g., concurrently) based on traffic conditions indicated by the remote data. In some configurations, the model selector 336, model scheduler 338, and/or computation frequency controller 340 may be executed in a sequential fashion and/or hierarchical fashion, where one adjustment is completed before another adjustment and/or where a series of adjustments may be conditionally based on the remote data.

In some configurations, two or more of the model selector 336, model scheduler 338, and computation frequency controller 340 (e.g., clock speed controller) may be utilized concurrently (e.g., in overlapping time periods, in parallel, etc.) and/or may be selected for utilization in accordance with a utilization selection approach (e.g., a predetermined selection approach). In an example of a utilization selection approach, the model selector 336 may be utilized first, then the model scheduler 338 second, and then the computation frequency controller 340 third. For example, each of the models may provide an associated accuracy (e.g., approximate accuracy). In some configurations, different cases (e.g., driving conditions, situations, etc.) may have associated target accuracies. For example, a target accuracy may be a minimum accuracy to provide a target performance. In this example, the model selector 336 may first select a model with an associated accuracy that will satisfy the target accuracy (e.g., provide an accuracy that is greater than or equal to the target accuracy) for a given case (e.g., driving conditions). For instance, the model selector 336 may select a lightest (e.g., least complex) model with an associated accuracy that also satisfies the target accuracy.

In some configurations, the model scheduler 338 may schedule the model by selecting a clock speed (e.g., a maximum clock speed at which to run the model). For example, the model scheduler 338 may utilize one or more strategies related to power budget and/or traffic conditions to schedule the model run-time explicitly or implicitly by choosing the clock speed. In some approaches, the model scheduler 338 may schedule the model selected by the model selector 336 (after model selection).

In some configurations, the computation frequency controller 340 may control the computation frequency. For example, the computation frequency controller 340 may utilize one or more computer vision algorithms on one or more frames that are missing from model (e.g., deep neural network) outputs. The computer vision algorithm(s) may utilize less power and/or operate relatively quickly (in comparison to a complex model, for example).

The model(s) 318 may produce a driving decision 342 based on the adjusted model 318 processing. The driving decision 342 may be provided to a driving controller 320 to control vehicle movement in some configurations.

Figure 4:
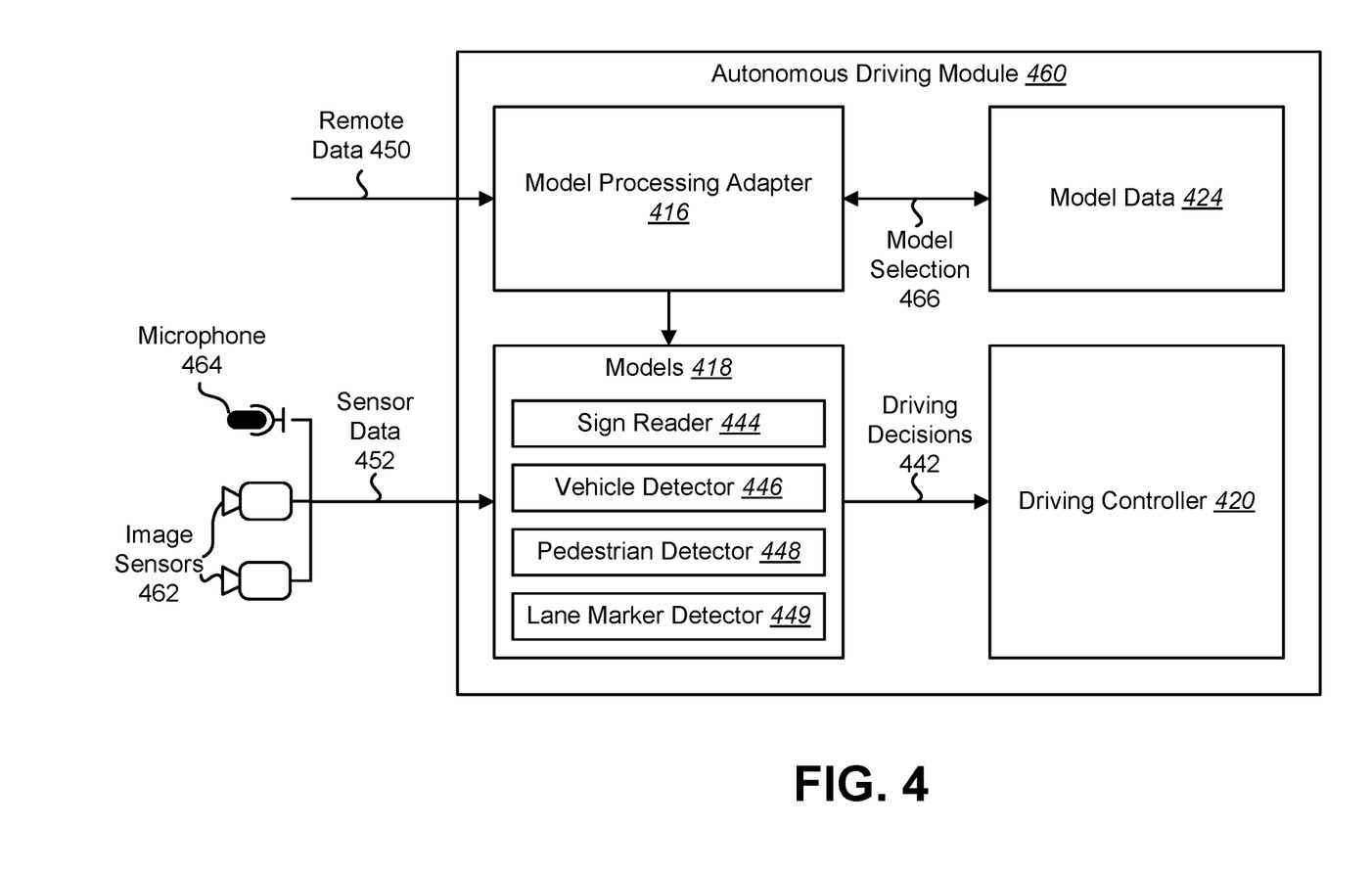
FIG. 4 is a block diagram illustrating an example of an autonomous driving module that may be implemented in accordance with the systems and methods disclosed herein.

FIG. 4 is a block diagram illustrating an example of an autonomous driving module 460 that may be implemented in accordance with the systems and methods disclosed herein. For example, one or more of the elements and/or functions described in connection with FIG. 4 may be included in and/or performed by the apparatus 102 described in connection with FIG. 1. In particular, FIG. 4 illustrates a model processing adapter 416, models 318, model data 424, and a driving controller 320. These elements may be examples of corresponding elements described in connection with FIG. 1. In some configurations, the autonomous driving module 460 described in connection with FIG. 4 may be implemented by the processor 112 described in connection with FIG. 1.

In the example illustrated in FIG. 4, remote data 450 (e.g., traffic conditions, TPEG data, etc.) is provided to the model processing adapter 416. The model processing adapter 416 may perform model selection 466 as described in connection with FIG. 1. For example, the model processing adapter 416 may select models 418 from the model data 424. The model data 424 may represent a library of models (e.g., trained models) for autonomous driving from which the models 418 may be selected. In some configurations, the model processing adapter 416 may perform additional or alternative functions as described in connection with the model processing adapter 116 of FIG. 1. For instance, the model processing adapter 416 may select models 418, perform model scheduling, select a frame computation frequency, and/or select one or more thresholds, which may impact the behavior of the models 418.

In the example illustrated in FIG. 4, the (selected) models 418 include a sign reader 444, a vehicle detector 446, a pedestrian detector 448, and a lane marker detector 449. Sensor data 452 is provided to the models 418 from image sensors 462 and/or a microphone 464. The models 418 may utilize the sensor data 452 to determine driving decisions 442. For example, the models 418 may utilize images and/or audio to read signs, detect vehicles, detect pedestrians, and/or detect lane markers. In some examples, each of the sign reader 444, the vehicle detector 446, the pedestrian detector 448, and the lane marker detector 449 are neural networks that utilize the sensor data 452 to make decisions on what a sign indicates, whether and where any vehicles are present in the images, whether and where any pedestrians are present in the images, and/or whether and where any lane markers are present in the images. These decisions may be utilized to make driving decisions 442 (e.g., route planning, acceleration control, braking control, steering control, etc.).

The driving decisions 442 may be provided to the driving controller 420. The driving controller 420 may implement the driving decisions 442. For example, the driving controller 420 may be an autonomous driving system controller. The driving controller 420 may provide signals to one or more actuators and/or controllers to control driving of a vehicle.

Figure 5:
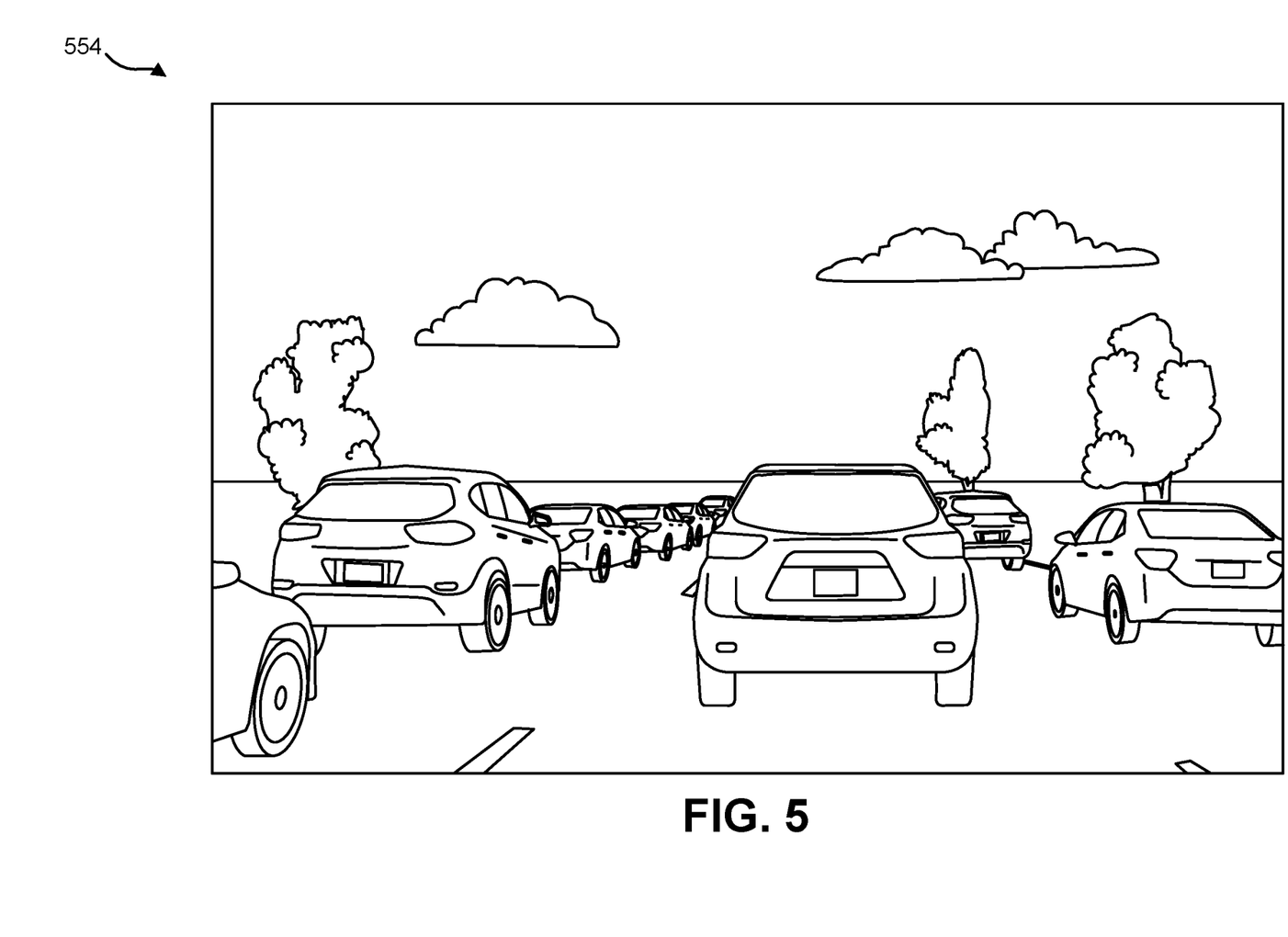
FIG. 5 is an illustration of a congested traffic condition.

FIG. 5 is an illustration 554 of a congested traffic condition. As described herein, lighter models may be selected, model scheduling may be reduced, and/or a frame computation frequency may be reduced in a case of a congested traffic condition. For example, because traffic is moving slowly, high intensity computations may not be needed. Accordingly, model processing may be adapted to reduce resource usage when a vehicle is in a congested traffic condition.

Figure 6:
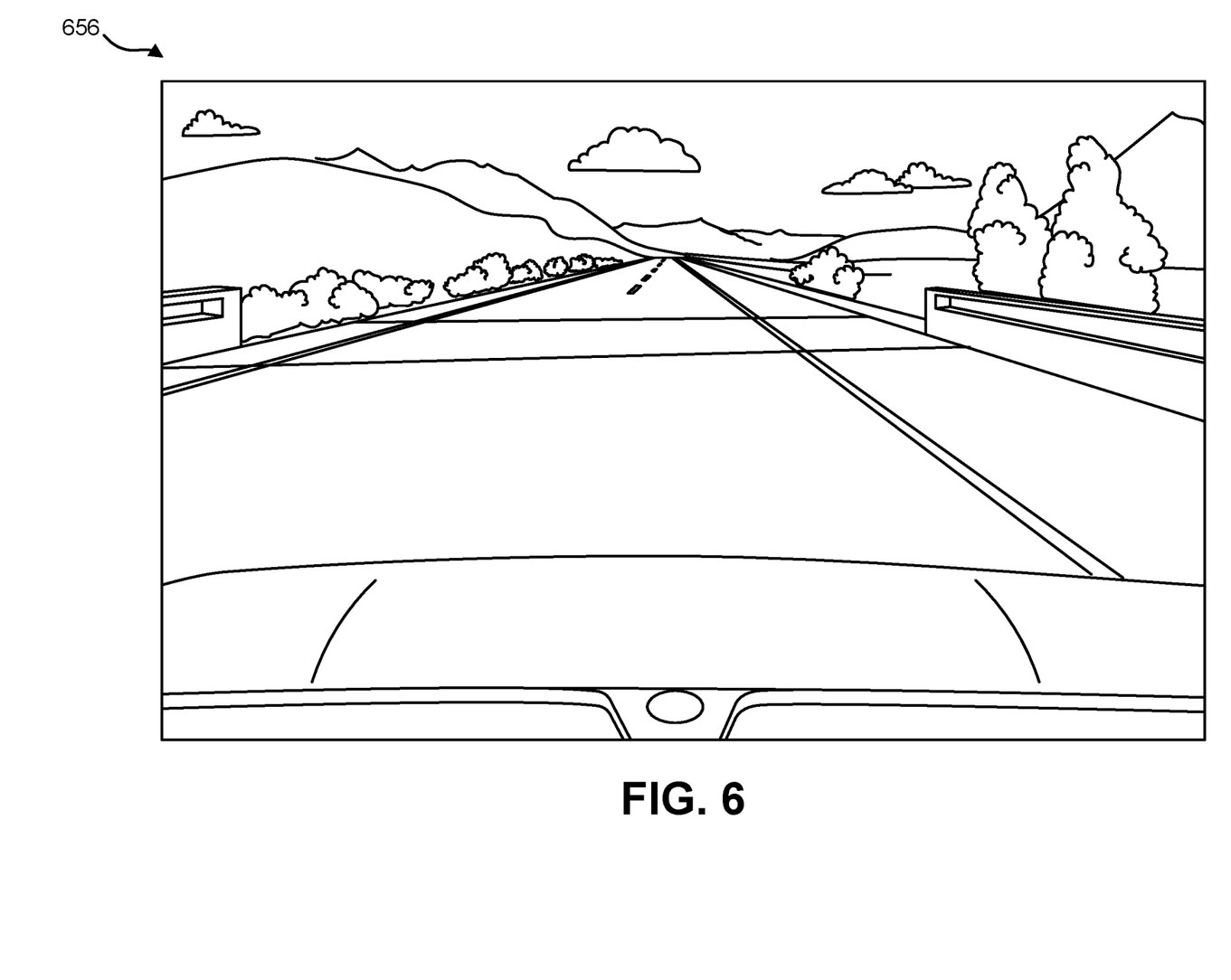
FIG. 6 is an illustration of an open road condition.

FIG. 6 is an illustration 656 of an open road condition. As described herein, lighter models may be selected, model scheduling may be reduced, and/or a frame computation frequency may be reduced in a case of an open road condition. For example, because there is likely a lack of other vehicles and obstacles, high intensity computations may not be needed. Accordingly, model processing may be adapted to reduce resource usage when a vehicle is in an open road condition.

Figure 7:
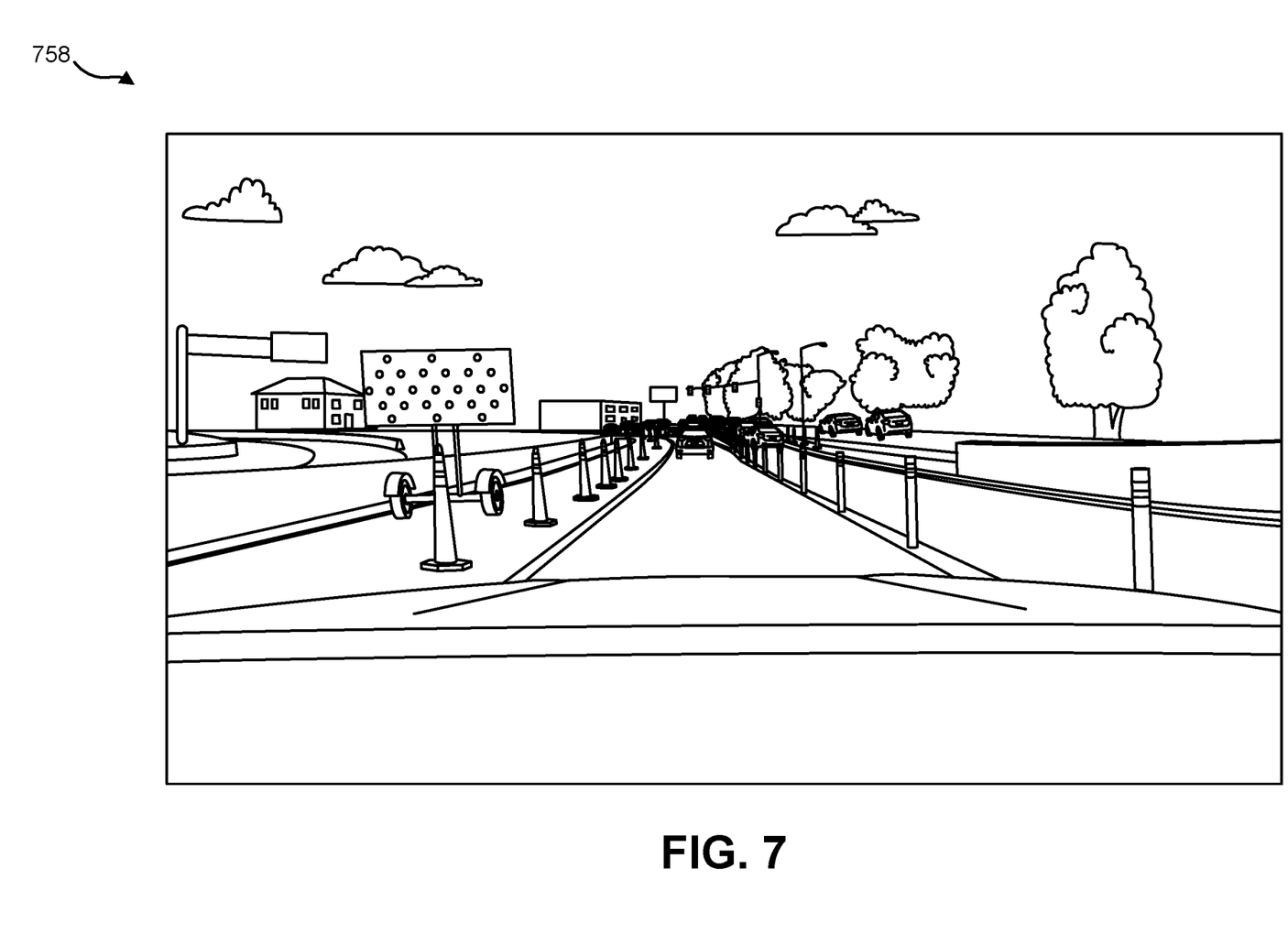
FIG. 7 is an illustration of a road construction condition.

FIG. 7 is an illustration 758 of a road construction condition. As described herein, heavier models may be selected, model scheduling may be increased, and/or a frame computation frequency may be increased in a case of a road construction condition. For example, because there are likely many objects (e.g., construction cones, barriers, other vehicles, etc.) in a road construction condition, increased computations may be utilized to maintain performance. Accordingly, model processing may be adapted to increase performance (e.g., precision, accuracy, speed, etc.) when a vehicle is in a road construction condition.

Figure 8:
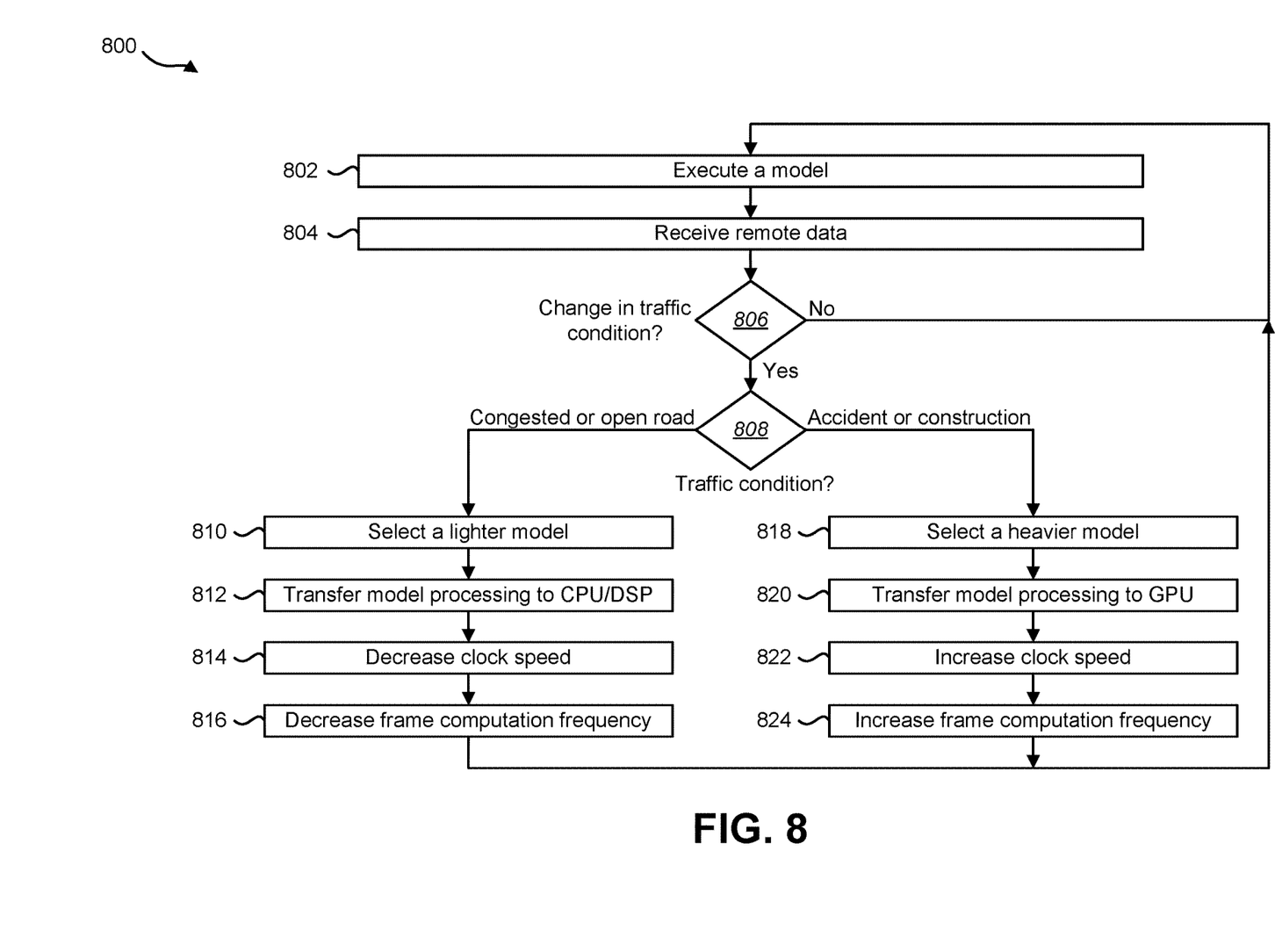
FIG. 8 is a flow diagram illustrating another configuration of a method for adaptive model processing.

FIG. 8 is a flow diagram illustrating another configuration of a method 800 for adaptive model processing. The method 800 may be performed by the apparatus 102 described in connection with FIG. 1, by the elements described in connection with FIG. 3, and/or by the autonomous driving module 460 described in connection with FIG. 4, for example.

The apparatus 102 may execute 802 one or more models. This may be accomplished as described in connection with FIG. 1. For example, the apparatus 102 may input sensor data to a model and execute the model to produce one or more outputs (e.g., detection results, driving decisions, etc.).

The apparatus 102 may receive 804 remote data. This may be accomplished as described in connection with FIG. 1. For example, the apparatus 102 may receive remote data, such as traffic condition information, news, weather information, construction alerts, travel times, etc., from one or more remote apparatuses.

The apparatus 102 may determine 806 whether a change in traffic condition has occurred. For example, the apparatus 102 may maintain a state corresponding to a traffic condition. If the sensor data indicates a different traffic condition than the traffic condition of the current state, the apparatus 102 may determine that there is a change in the traffic condition. In a case that there is no change in the traffic condition, the apparatus 102 may continue to execute 802 the model(s) and receive 804 remote data.

In a case that a change in traffic condition is detected, the apparatus 102 may determine 808 whether the new traffic condition is a congested traffic condition or an open road condition. In a case that the new traffic condition is a congested traffic condition or an open road condition, the apparatus 102 may select 810 a lighter model, may transfer 812 model processing to a CPU and/or DSP, may decrease 814 clock speed for the CPU and/or DSP, and/or may decrease 816 frame computation frequency. One or more of these operations may be performed as described in connection with FIG. 1.

In a case that the new traffic condition is an accident traffic condition or road construction condition, the apparatus 102 may select 818 a heavier model, may transfer 820 model processing to a GPU, may increase 822 clock speed for the GPU, and/or may increase 824 frame computation frequency. One or more of these operations may be performed as described in connection with FIG. 1. The apparatus 102 may return to execute 802 the model(s) in accordance with the updated selection and/or settings.

Figure 9:
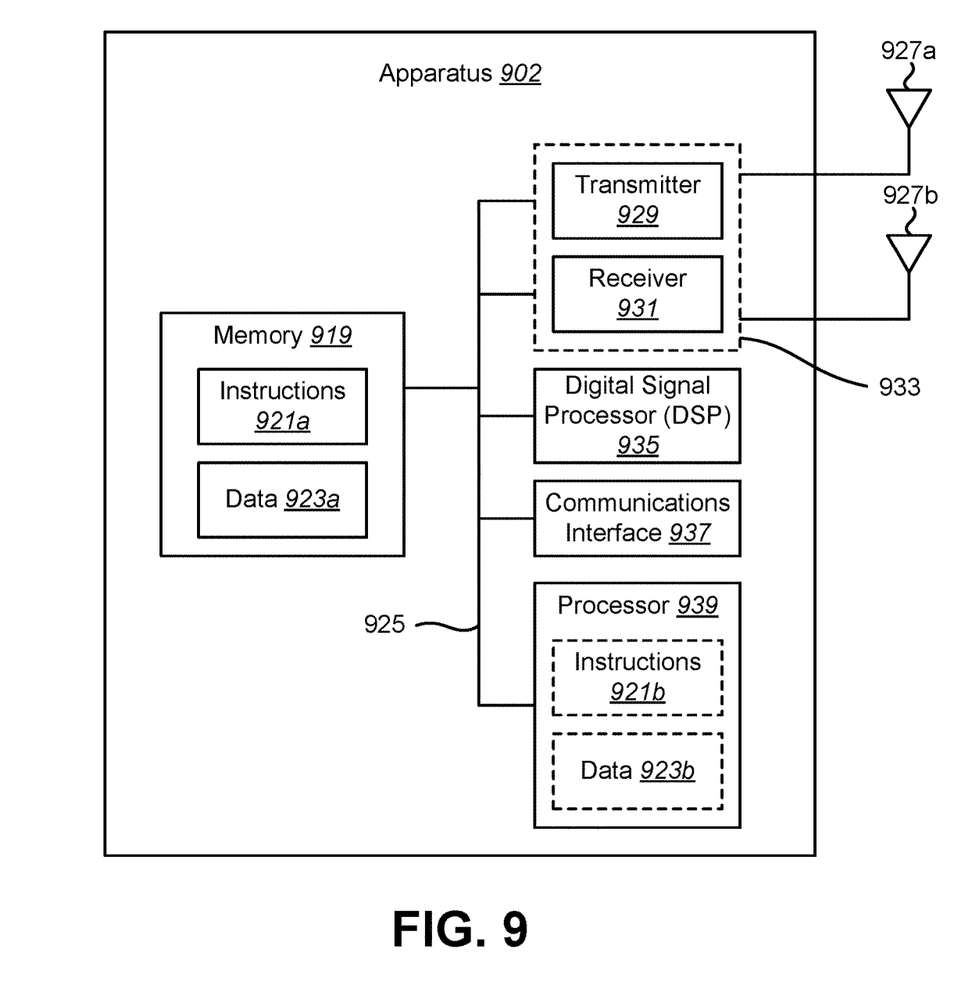
FIG. 9 illustrates certain components that may be included within an apparatus configured to implement various configurations of the systems and methods disclosed herein.

FIG. 9 illustrates certain components that may be included within an apparatus 902 configured to implement various configurations of the systems and methods disclosed herein. Examples of the apparatus 902 may include vehicles, cameras, video camcorders, digital cameras, smart phones, computers (e.g., integrated computers, desktop computers, laptop computers, vehicle console computers, etc.), tablet devices, media players, televisions, vehicles, autonomous vehicles, semi-autonomous vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), personal digital assistants (PDAs), etc. The apparatus 902 may be implemented in accordance with the apparatus 102 described in connection with FIG. 1.

The apparatus 902 includes a processor 939. The processor 939 may be a general purpose single- or multi-chip microprocessor (e.g., an ARM), a special purpose microprocessor (e.g., a digital signal processor (DSP)), a microcontroller, a programmable gate array, etc. The processor 939 may be referred to as a central processing unit (CPU). Although just a single processor 939 is shown in the apparatus 902, in an alternative configuration, a combination of processors (e.g., an ARM and DSP or a GPU and a DSP) could be implemented.

The apparatus 902 also includes memory 919. The memory 919 may be any electronic component capable of storing electronic information. The memory 919 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 923a and instructions 921a may be stored in the memory 919. The instructions 921a may be executable by the processor 939 to implement one or more of the methods 200, 800, procedures, steps, and/or functions described herein. Executing the instructions 921a may involve the use of the data 923a that is stored in the memory 919. When the processor 939 executes the instructions 921, various portions of the instructions 921b may be loaded onto the processor 939 and/or various pieces of data 923b may be loaded onto the processor 939.

The apparatus 902 may also include a transmitter 929 and/or a receiver 931 to allow transmission and reception of signals to and from the apparatus 902. The transmitter 929 and receiver 931 may be collectively referred to as a transceiver 933. One or more antennas 927a-b may be electrically coupled to the transceiver 933. The apparatus 902 may also include (not shown) multiple transmitters, multiple receivers, multiple transceivers and/or additional antennas.

The apparatus 902 may include a digital signal processor (DSP) 935. The apparatus 902 may also include a communications interface 937. The communications interface 937 may allow and/or enable one or more kinds of input and/or output. For example, the communications interface 937 may include one or more ports and/or communication devices for linking other devices to the apparatus 902. In some configurations, the communications interface 937 may include the transmitter 929, the receiver 931, or both (e.g., the transceiver 933). Additionally or alternatively, the communications interface 937 may include one or more other interfaces (e.g., touchscreen, keypad, keyboard, microphone, camera, etc.). For example, the communication interface 937 may enable a user to interact with the apparatus 902.

The various components of the apparatus 902 may be coupled together by one or more buses, which may include a power bus, a control signal bus, a status signal bus, a data bus, etc. For the sake of clarity, the various buses are illustrated in FIG. 23 as a bus system 925.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed at a vehicle, comprising:
   receiving, at the vehicle, remote data including current traffic conditions associated with a location of the vehicle;
   receiving sensor data via one or more sensors of the vehicle;
   determining, at the vehicle, a change in traffic conditions based on the remote data including the current traffic conditions associated with the location of the vehicle;
   adapting, at the vehicle, model processing based on at least the determined change in traffic conditions;
   processing, at the vehicle, the sensor data received via the one or more sensors of the vehicle based on the adapted model processing; and
   determining, at the vehicle, a driving decision for the vehicle based on the processing.

2. The method of claim 1, wherein adapting model processing comprises selecting a neural network based on the remote data.

3. The method of claim 2, wherein selecting the neural network comprises selecting between a first neural network and a second neural network.

4. The method of claim 3, wherein the first neural network includes more nodes than the second neural network.

5. The method of claim 3, wherein the first neural network utilizes more multiply-accumulate operations (MACs) or floating point operations per second (FLOPs) than the second neural network.

6. The method of claim 1, wherein adapting model processing comprises adjusting neural network scheduling.

7. The method of claim 6, wherein adjusting the neural network scheduling comprises adjusting a computation rate for a neural network.

8. The method of claim 6, wherein adjusting the neural network scheduling comprises transferring neural network computation from a first processor to a second processor.

9. The method of claim 1, wherein adapting model processing comprises adjusting a frame computation frequency for a neural network.

10. The method of claim 9, wherein the neural network is computed for a first subset of a set of frames and computer vision tracking is performed for at least a second subset of frames, wherein the second subset of frames is complementary to the first subset of frames.

11. A vehicle apparatus, comprising:
a memory;
one or more sensors; and
at least one processor in electronic communication with the memory and the one or more sensors, wherein the at least one processor is configured to:
receive remote data including current traffic conditions associated with a location of the vehicle apparatus;
receive sensor data via the one or more sensors of the vehicle apparatus;
determine a change in traffic conditions based on the remote data including the current traffic conditions associated with the location of the vehicle apparatus;
adapt model processing based on at least the determined change in traffic conditions;
process the sensor data received via the one or more sensors of the vehicle apparatus based on the adapted model processing; and
determine a driving decision for the vehicle apparatus based on the processing.

12. The vehicle apparatus of claim 11, wherein the at least one processor is configured to adapt the model processing by selecting a neural network based on the remote data.

13. The vehicle apparatus of claim 12, wherein the at least one processor is configured to select the neural network by selecting between a first neural network and a second neural network.

14. The vehicle apparatus of claim 13, wherein the first neural network includes more nodes than the second neural network.

15. The vehicle apparatus of claim 13, wherein the first neural network is configured to utilize more multiply-accumulate operations (MACs) or floating point operations per second (FLOPs) than the second neural network.

16. The vehicle apparatus of claim 11, wherein the at least one processor is configured to adapt model processing by adjusting neural network scheduling.

17. The vehicle apparatus of claim 16, wherein the at least one processor is configured to adjust the neural network scheduling by adjusting a computation rate for a neural network.

18. The vehicle apparatus of claim 16, wherein the at least one processor is configured to adjust the neural network scheduling by transferring neural network computation from a first processor to a second processor.

19. The vehicle apparatus of claim 11, wherein the at least one processor is configured to adapt model processing by adjusting a frame computation frequency for a neural network.

20. The vehicle apparatus of claim 19, wherein the at least one processor is configured to compute the neural network for a first subset of a set of frames and to perform computer vision tracking for at least a second subset of frames, wherein the second subset of frames is complementary to the first subset of frames.

21. A non-transitory tangible computer-readable medium storing computer executable code that, when executed, cause one or more processors of a vehicle to:
receive remote data including current traffic conditions associated with a location of the vehicle;
receive sensor data via one or more sensors of the vehicle;
determine a change in traffic conditions based on the remote data including the current traffic conditions;
adapt model processing based on at least the determined change in traffic conditions associated with the location of the vehicle;
process the sensor data received via the one or more sensors of the vehicle based on the adapted model processing; and
determine a driving decision for the vehicle based on the processing.

22. The computer-readable medium of claim 21, wherein the code for causing the apparatus to adapt the model processing comprises code for causing the apparatus to select a neural network based on the remote data.

23. The computer-readable medium of claim 22, wherein the code for causing the apparatus to select the neural network comprises code for causing the apparatus to select between a first neural network and a second neural network.

24. The computer-readable medium of claim 21, wherein the code for causing the apparatus to adapt model processing comprises code for causing the apparatus to adjust neural network scheduling.

25. The computer-readable medium of claim 21, wherein the code for causing the apparatus to adapt model processing comprises code for causing the apparatus to adjust a frame computation frequency for a neural network.

26. A vehicle apparatus, comprising:
means for receiving remote data including current traffic conditions associated with a location of the vehicle apparatus;
means for receiving sensor data via one or more sensors of the vehicle apparatus;
means for determining a change in traffic conditions based on the remote data including the current traffic conditions associated with the location of the vehicle apparatus;
means for adapting model processing based on at least the determined change in traffic conditions;
means for processing the sensor data received via the one or more sensors of the vehicle apparatus based on the adapted model processing; and
means for determining a driving decision for the vehicle apparatus based on the processing.

27. The vehicle apparatus of claim 26, wherein the means for adapting the model processing comprises means for selecting a neural network based on the remote data.

28. The vehicle apparatus of claim 27, wherein the means for selecting the neural network comprises means for selecting between a first neural network and a second neural network.

29. The vehicle apparatus of claim 26, wherein the means for adapting model processing comprises means for adjusting neural network scheduling.

30. The vehicle apparatus of claim 26, wherein the means for adapting model processing comprises means for adjusting a frame computation frequency for a neural network.

\* \* \* \* \*